United States Patent [19]

Tenthoff

[11] Patent Number: 4,990,265
[45] Date of Patent: Feb. 5, 1991

[54] METHOD OF DEWATERING OIL MUD

[75] Inventor: Aloys Tenthoff, Oelde, Fed. Rep. of Germany

[73] Assignee: Westfalia Separator AG, Oelde, Fed. Rep. of Germany

[21] Appl. No.: 393,350

[22] Filed: Aug. 11, 1989

[30] Foreign Application Priority Data

Aug. 30, 1988 [DE] Fed. Rep. of Germany ....... 3829309

[51] Int. Cl.$^5$ .............................................. B04B 5/10
[52] U.S. Cl. ..................................... 210/739; 208/13; 210/787; 210/790; 494/37; 494/66; 494/901
[58] Field of Search ................. 208/13, 186, 187, 179; 210/242.1, 747, 787, 790, 804, 806, 739; 114/74 R; 494/2, 3, 37, 66, 901, 31, 32; 440/88

[56] References Cited

U.S. PATENT DOCUMENTS

| 3,572,582 | 3/1971 | Seielstad | 494/101 |
| 4,411,645 | 10/1983 | Tenthoff | 494/3 |
| 4,415,430 | 11/1983 | York | 210/806 |
| 4,525,155 | 6/1985 | Nilsson | 494/3 |
| 4,689,157 | 8/1987 | Tenthoff | 210/787 |
| 4,755,165 | 7/1988 | Gunnewig | 494/37 |
| 4,778,443 | 10/1988 | Sands et al. | 494/37 |
| 4,784,751 | 11/1988 | McGehee | 208/187 |

FOREIGN PATENT DOCUMENTS

| 3020501 | 12/1981 | Fed. Rep. of Germany | 208/179 |
| 0252693 | 12/1985 | Japan | 208/186 |
| 1221047 | 3/1986 | U.S.S.R. | 114/74 R |
| 1301442 | 4/1987 | U.S.S.R. | 210/806 |

Primary Examiner—Richard V. Fisher
Assistant Examiner—Joseph Drodge
Attorney, Agent, or Firm—Sprung, Horn, Kramer & Woods

[57] ABSTRACT

A method of dewatering oil mud that occurs on board ships during the processing of heavy, diesel, and lubricating oils and consists of a mixture of water and mineral-oil residue that is intercepted on board and subjected to centrifuging. The liquids contaminated with mineral-oil residue that occur on board are collected in two separate containers. The liquids that contain heavy oil and diesel oil are conveyed to the first container and the liquids that contain lubricating oil are conveyed to the second container along with the water that occurs when the oils are processed. The contents of the containers are then conveyed sequentially to one and the same centrifuging device to concentrate the solids. The resulting liquid phases are subjected to separate further processing with on-board equipment, allowing complete disposal or further use of the liquids.

4 Claims, 1 Drawing Sheet

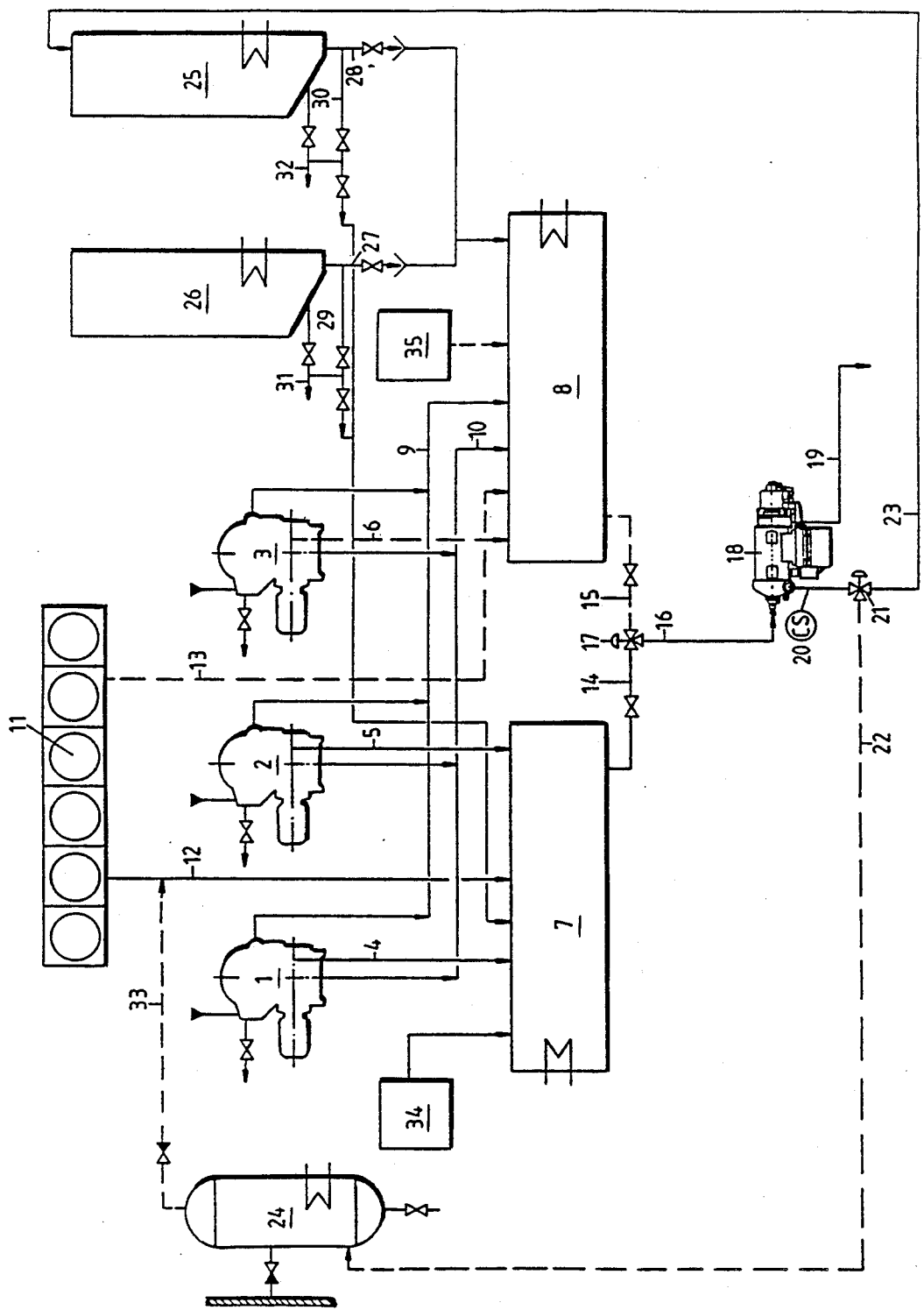

METHOD OF DEWATERING OIL MUD

BACKGROUND OF THE INVENTION

The invention concerns a method of dewatering oil mud that occurs on board ships during the processing of heavy, diesel, and lubricating oils and consists of a mixture of water and mineral-oil residue that is intercepted on board and subjected to centrifuging.

"Oil mud" means the mixture of water, oil, and solids that occurs during separation and filtration. The oil muds can either be removed in the harbor by pumping them into waste-disposal ships, which is expensive, or processed on board the original vessel.

A method of treating oil muds that involves collecting all the liquids in a buffer container and subsequently centrifuging them is known from German OS 2 438 602. The centrifugal separation of this mixture of various oils and water is not free of problems in that only relatively low throughputs can be attained and the separated phases are not satisfactorily pure. Since oil mud also contains waste water that in turn includes oil, considerable volumes of a material that can only be considered difficult to separate are involved.

German AS 2 362 665 describes a method of processing large volumes of muddy and oily waste material. The mud is treated at temperatures of 500° to 600° C., requiring a considerable consumption of outside energy. The method is very complicated and is accordingly appropriate only for stationary plants.

Using separate separators to process heavy oil and diesel oil is known from German OS 3 020 501. The resulting oil mud is collected in a mud tank and conveyed through a line to a mud burner. This method also requires considerable energy.

SUMMARY OF THE INVENTION

The object of the present invention is to provide a cost-effective method of dewatering oil mud on board a ship that will reduce the volume of the difficult-to-separate mixture while improving the quality of the resulting oil and water.

This object is attained by the improvement wherein the liquids contaminated with mineral-oil residue that occur on board are collected in two separate containers, wherein the liquids that contain heavy oil and diesel oil are conveyed to the first container and the liquids that contain lubricating oil are conveyed to the second container along with the water that occurs when the oils are processed, wherein the contents of the containers are then conveyed sequentially to one and the same centrifuging device to . concentrate the solids, and wherein the resulting liquid phases are subjected to separate further processing with on-board equipment, allowing complete disposal or further use of the liquids.

The result of this method is that the oil mud is separated into a difficult-to-break-down oil mud that contains heavy oil and diesel oil and very little water and an easy-to-break-down oil mud that contains lubricating oil. This approach eliminates the problem of the difficult-to-separate mixture in relation to the volume of the two different types of oil mud. The two types of oil mud are treated in a single centrifuging device, with the separated liquid phases varying widely in quality, one consisting mainly of water with traces of oil and the other of heavy oil with traces of water. These different streams of liquid can easily be treated with the equipment already on board for processing heavy oil, diesel oil, and lubricating oil to the extent that they can be completely removed. The recovered oil can be exploited as fuel to power the ship, and the separated water will be high enough in quality to be pumped overboard.

The liquid phase resulting from centrifuging the contents of the first container can be conveyed to a settling tank and the liquid phase resulting from centrifuging the contents of the second container can be conveyed to an oil separator.

The liquid phase resulting from centrifuging the contents of the first container can alternatively be conveyed, depending on how much oil it contains, either to a settling tank or to an oil separator.

The centrifuging can be carried out with a solid-bowl helical centrifuge.

BRIEF DESCRIPTION OF THE DRAWING

One embodiment of the invention will now be described with reference to the drawings wherein the Figure is a schematic diagram of a system according to the invention.

DETAILED DESCRIPTION OF THE INVENTION

The system comprises a heavy-oil centrifuge 1, a diesel-oil centrifuge 2, and a lubricating-oil centrifuge 3. The solids outlets 4 and 5 from centrifuges 1 and 2 open into an oil-mud container 7 and the solids outlet 6 from lubricating-oil centrifuge 3 opens into another oil-mud container 8. The water separated in centrifuges 1, 2, and 3 travels through a line 9 into second container 8. The water employed to automatically empty centrifuges 1, 2, and 3 also flows into second container 8 through another line 10. A line 12 that collects any heavy oil leaking out of the ship's main engine 11 leads to first container 7, and a line 13 that collects any lubricating oil that leaks out of the engine leads to second container 8. Containers 7 and 8 communicate by way of lines 14, 15, and 16 and a diversion valve 17 with the intake of a fourth centrifuge 18 that separates the mixture supplied to it into compact solids and a liquid phase. The solids leave fourth centrifuge 18 through an outlet 19, and the liquid phase is conveyed through a sensor 20, another diversion valve 21, and lines 22 and 23 to either an oil separator 24 or a settling tank 25. Fuel for powering the main engine is stored in a service tank 26. Dewatering lines 27 and 28 extend from tanks 25 and 26 to second container 8 and mud lines 29 and 30 to first container 7. Service tank 26 communicates by way of a line 31 with main engine 11. Another line 32 leads from settling tank 25 to heavy-oil centrifuge 1. The oil separated out in oil separator 24 is conveyed by way of a line 33 and heavy-oil leakage line 12 into first container 7, and the water is pumped overboard. The residual oil from a heavy-oil filter 34 is conveyed into first container 7 and the residual oil from a lubricating-oil filter 35 into second container 8.

The oil mud collecting in first container 7 consists of approximately 5% solids, 10% water, and 85% oil (heavy oil, diesel oil, and used oil). This mixture is heated to 80° to 90° C. and conveyed to fourth centrifuge 18.

The oil mud in second container 8 consists of approximately 5% mud, 15% lubricating oil, and 80% water. This mixture is also heated to 80° to 90° C. and conveyed to fourth centrifuge 18.

The liquid phase leaving the centrifuge originally consists of a mixture of liquids with a high content of water and only a little oil. As long as sensor 20 detects that the oil content is less than 10% for example, second diversion valve 21 will divert the liquid phase to oil separator 24 by way of line 22. The water can, after being processed in oil separator 24, be pumped overboard and the recovered oils and fuel can, after being purified in heavy-oil centrifuge 1, be conveyed in the form of fuel to main engine 11. If the oil content exceeds 10%, second diversion valve 21 will divert the liquid phase to settling tank 25 by way of line 23, where the water will settle along with any particles of solids. Settling tank 25 is dewatered manually by way of line 28 from time to time.

It will be appreciated that the instant specifications and claims are set forth by way of illustration and not limitation, and that various modifications and changes may be made without departing from the spirit and scope of the present invention.

What is claimed is:

1. A method of dewatering oil mud that occurs on board ships during treatment of heavy, diesel, and lubricating oils and which consists of a mixture of water and mineral-oil residue, comprising the steps of treating mixtures respectively comprising heavy, diesel and lubricating oils to obtain respective oil mud liquids and water, collecting said two separate containers by conveying liquids that contain heavy oil and diesel oil to a first container and conveying liquids that contain lubricating oil to a second container along with water obtained from treatment of the oils, sequentially conveying the contents of the two containers to one and the same centrifuging device, centrifuging the sequentially conveyed contents to concentrate solids from liquid phases, and subjecting resulting liquid phases to separate further treatment with on-board equipment to permit disposal or further use of the liquids.

2. The method as in claim 1, further comprising conveying the liquid phases resulting from centrifuging liquids from the first container to a settling tank and conveying the liquid phases resulting from centrifuging liquids from the second container to an oil separator.

3. The method as in claim 1, further comprising conveying the liquid phases resulting from centrifuging liquids from the first container to a settling tank or to an oil separator in dependence upon the percentage of oil in the liquid phases leaving the centrifuge at any given time.

4. The method as in claim 1, wherein the centrifuging is carried out with a solid-bowl helical centrifuge.

* * * * *